United States Patent
Preuss

(10) Patent No.: US 9,866,096 B2
(45) Date of Patent: Jan. 9, 2018

(54) LINEAR DRIVE

(71) Applicant: Robert Bosch GmbH, Stuttgart (DE)

(72) Inventor: Felix Preuss, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 388 days.

(21) Appl. No.: 14/758,205

(22) PCT Filed: Oct. 24, 2013

(86) PCT No.: PCT/EP2013/072251
§ 371 (c)(1),
(2) Date: Jun. 26, 2015

(87) PCT Pub. No.: WO2014/102022
PCT Pub. Date: Jul. 3, 2014

(65) Prior Publication Data
US 2015/0357895 A1 Dec. 10, 2015

(30) Foreign Application Priority Data
Dec. 27, 2012 (DE) .................. 10 2012 224 367

(51) Int. Cl.
*H02K 41/02* (2006.01)
*H02K 41/025* (2006.01)
(Continued)

(52) U.S. Cl.
CPC ........... *H02K 41/02* (2013.01); *H02K 11/215* (2016.01); *H02K 41/025* (2013.01);
(Continued)

(58) Field of Classification Search
CPC .... H02K 41/025; H02K 41/031; H02K 41/02; H02K 11/215; H02K 29/08; H02K 16/02
See application file for complete search history.

(56) References Cited

U.S. PATENT DOCUMENTS 4,259,602 A * 3/1981 Kuribayashi ........ H02K 41/031
310/12.01
4,727,813 A * 3/1988 Matsuo .................. B60L 13/03
104/290

(Continued)

FOREIGN PATENT DOCUMENTS

DE 1806977 A1 6/1969
DE 4126454 2/1993
(Continued)

OTHER PUBLICATIONS

International Search Report for Application No. PCT/EP2013/072251 dated Sep. 30, 2014 (English Translation, 3 pages).

*Primary Examiner* — Mohamad Musleh
(74) *Attorney, Agent, or Firm* — Michael Best & Friedrich LLP

(57) ABSTRACT

The present invention relates to a linear drive (1), comprising a running track (2), at least one movement unit (4) with at least one magnetic element (5), which is linearly movable on the running track (2), a plurality of electrical primary magnets (3) which are stationarily arranged on the running track (2) and act magnetically upon the at least one magnetic element (5), wherein the primary magnets (3) can be activated individually or in groups for driving the movement unit (4), a magnetically activatable element (7) on the movement unit (4), wherein the magnetically activatable element (7) can be activated by at least one primary magnet (3) independently of the drive of the movement unit (4), and an actuator (9) and/or a load on the movement unit (4), the magnetically activatable element (7) being in operative connection with the actuator (4) and/or the load.

19 Claims, 4 Drawing Sheets

(51) Int. Cl.
  *H02K 41/03*      (2006.01)
  *H02K 11/215*     (2016.01)
  *H02K 29/08*      (2006.01)
  *H02K 16/02*      (2006.01)

(52) U.S. Cl.
  CPC .......... *H02K 41/031* (2013.01); *H02K 16/02* (2013.01); *H02K 29/08* (2013.01)

(56) References Cited

U.S. PATENT DOCUMENTS

| | | | | |
|---|---|---|---|---|
| 5,023,495 | A * | 6/1991 | Ohsaka | H02K 41/031 310/12.15 |
| 5,130,583 | A * | 7/1992 | Andoh | B60L 15/005 310/12.01 |
| 2002/0093252 | A1 | 7/2002 | Kang et al. | |
| 2009/0179505 | A1 * | 7/2009 | Hoppe | H02K 41/031 310/12.17 |
| 2009/0283841 | A1 | 11/2009 | Yeh et al. | |
| 2010/0031856 | A1 * | 2/2010 | Shoda | B60L 5/005 108/21 |

FOREIGN PATENT DOCUMENTS

| | | | |
|---|---|---|---|
| DE | 10334736 | 2/2005 | |
| DE | 10334737 A1 | 2/2005 | |
| DE | 102006036289 A1 | 2/2008 | |
| DE | 102008018078 | 10/2009 | |
| DE | 102011075445 A1 | 11/2012 | |
| FR | 2259472 A1 * | 8/1975 | .......... H02K 41/031 |
| WO | 2006108852 | 10/2006 | |

* cited by examiner

LINEAR DRIVE

BACKGROUND OF THE INVENTION

The present invention relates to a linear drive, in particular to a linear direct drive.

Linear drives usually have a running track comprising a plurality of stationary primary magnets. At least one movement unit is arranged on the running track in a linearly movable manner. Secondary magnets are provided in the movement unit. The primary magnets act magnetically upon the secondary magnets; thus enabling the movement unit to be moved along the running track in accordance with the activation of the primary magnets. A transmission of mechanical or electrical energy to the movement unit is required for manipulating the movement units themselves as well as, e.g., for holding or grasping objects on said movement unit. In the prior art, this energy transmission takes place via cables, tubes or sliding contacts. In the prior art, there is, e.g., additionally external curves or mechanical stops, by means of which the mechanical energy or a mechanical control signal can be transmitted to the movement unit. As a result, the location of the energy or control signal transmission is permanently defined by the position of the external curves or stops.

SUMMARY OF THE INVENTION

It is possible with the inventive linear drive to transmit additional energy to the movement unit independently of the drive of the movement unit. This does not require any accompanying cables or sliding contacts. The energy transmission to the movement unit is therefore free from wear and friction. The transmission of energy according to the invention can furthermore be used with continuously circulating running tracks. All of these advantages are achieved by means of a linear drive according to the invention, in particular a linear direct drive comprising a running track. The running track is, in particular, continuous, i.e. designed as a closed ring. In addition, the linear drive comprises at least one movement unit which is linearly movable on the running track. The movement unit comprises at least one magnetic element, preferably designed as a secondary iron circuit and or as a secondary magnet. The magnetic element is particularly designed as a permanent or electromagnet. Provision is furthermore made according to the invention for a plurality of primary magnets to be stationarily arranged on the running track. The primary magnets are designed as electromagnets, for example as coils. By means of activating the primary magnets individually or in groups, a magnetic force works on the magnetic elements; thus enabling the movement unit to move along the running track. An element that can be magnetically activated is provided on the movement unit. This magnetically activatable element is activated by at least one primary magnet, in particular for the energy transmission to the magnetically activatable element. The activation of the magnetically activatable element takes place independently of the drive of the movement unit. In addition, an actuator and/or a load can be arranged on the movement unit. The magnetically activatable element is in operative connection with the actuator and/or the load. It was recognized within the scope of the invention that the primary magnets that are currently not being used can be used to transmit energy to the movement unit. To this end, the magnetically activatable element is provided on the movement unit, said magnetically activatable element always being situated in the potential magnetic field of the primary magnets. The invention makes it possible, via the existing infrastructure of the linear drive, to implement an independently controllable magnetic circuit that acts on the magnetically activatable element as a result of separately activating the primary coils. This magnetic circuit facilitates among other things the generation of mechanical energy on the transport unit without an external energy line, e.g. via cables or tubes. The invention enables magnetic energy to be transmitted at every position of the linear drive without impairing the drive power.

Provision is made in a preferred manner for at least one primary magnet to be used to activate the magnetically activatable element, in particular to transmit energy to the magnetically activatable element, said primary magnet not being used to drive the movement unit at the moment of activation. An essential feature of the invention is that the already existing primary magnets can be used for transmitting energy to the magnetically activatable element. To this end, those primary magnets are advantageously used which are located in the immediate proximity of the movement unit, but are not themselves involved in driving said movement unit, consequently are not being used at the moment. This allows for a simple activation or, respectively, energy transmission to the magnetically activatable element via the control software of the linear drive at every position of the system on any number of movement units independently of one another.

Provision is furthermore made for the magnetically activatable element to act mechanically upon the actuator. For this reason, the magnetically activatable element is particularly designed as a ferromagnetic component of as a permanent magnet.

Provision is furthermore made in a preferred manner for the magnetically activatable element to be disposed in the direction of movement of the movement unit in front of or behind the magnetic elements. As a result, the magnetically activatable element is as close as possible to the primary magnets which, at the moment of activation of said magnetically activatable element, are not being used to drive the movement unit.

In addition, provision is made in a preferred manner for the magnetically activatable element to comprise an induction coil. Voltage can be induced into the induction coil by means of the primary magnets. The load and/or the actuator on the movement element are preferably supplied with current via the induction coil.

The actuator is preferably designed for moving and/or holding objects on the movement unit.

Alternatively or in addition thereto, the actuator can be designed to switch mechanical devices and/or to switch current circuits.

It is furthermore possible for the actuator to be designed to switch a device that changes the running properties of the movement unit.

Provision is particularly made for the actuator and/or the load on the movement unit to be designed as follows: as a gripper and/or entrainer and/or for switching valves and/or for generating vibrations and/or for moving objects and/or as a coupling system for coupling and decoupling a plurality of movement units among one another and/or for loading/unloading products and/or for generating pumping movements (compressed air or vacuum) and/or for generating ram movements (e.g. for compressing or compacting) and/or for driving an electric generator and/or for driving a diaphragm pump and/or for switching points on the running track and/or for loading/unloading the movement units themselves (overcoming the magnetic attraction force) and/or for switching magnetic shape memory alloys and/or for switching current circuits and/or for activating mechanical braking systems (emergency shutdown) and/or as a status indicator (position indicator) and/or as a micro-control.

BRIEF DESCRIPTION OF THE DRAWINGS

Exemplary embodiments of the invention with reference to the accompanying drawings are described below in detail. In the drawings.

DETAILED DESCRIPTION

Figure 1:
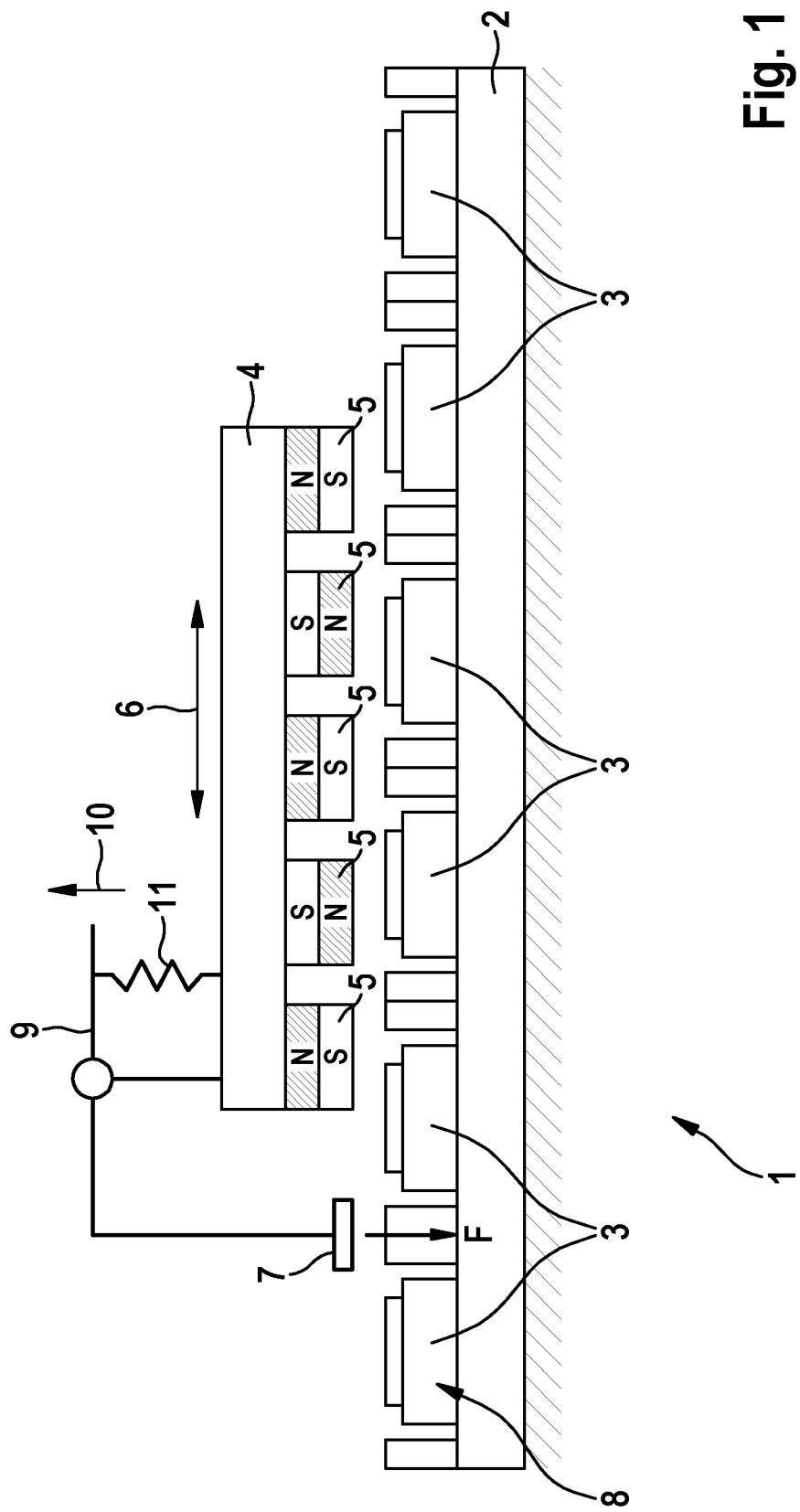
FIG. 1 shows a schematically simplified view of a linear drive according to the invention for both exemplary embodiments.
Figure 2:
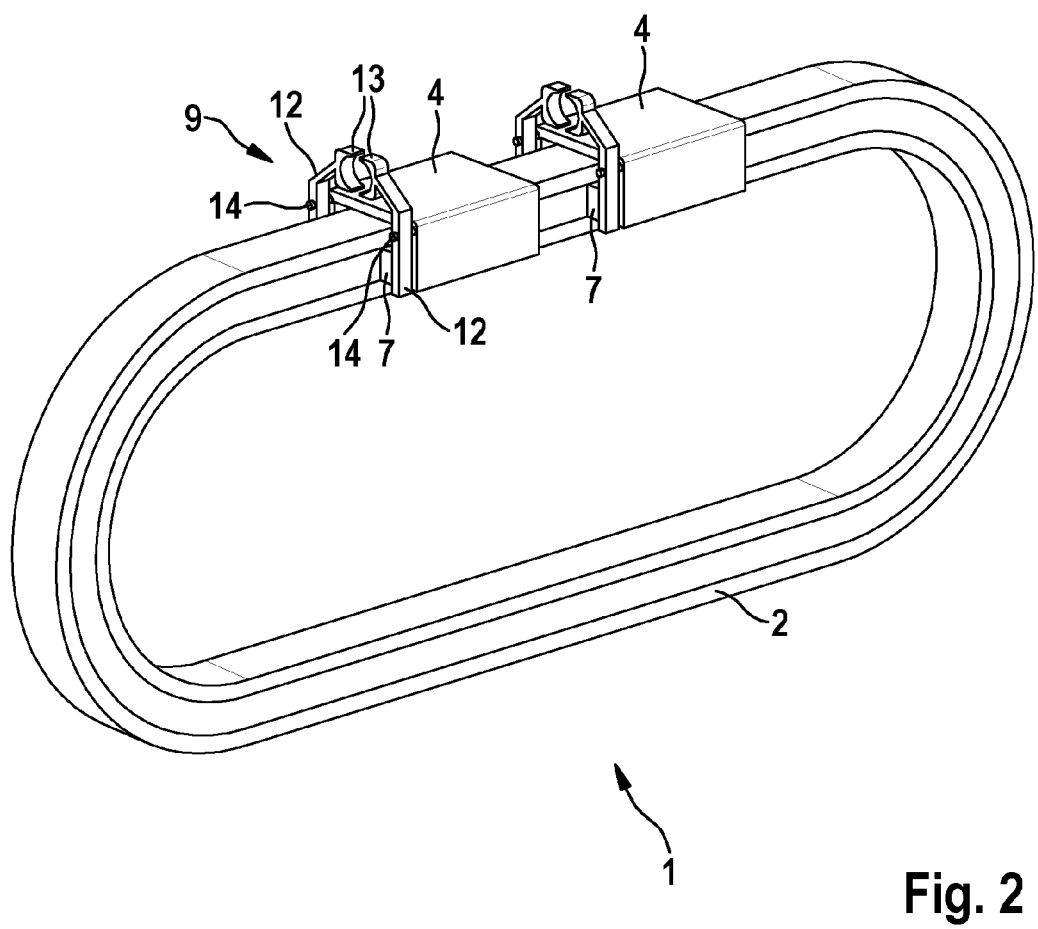
FIG. 2 shows the inventive linear drive according to a first exemplary embodiment.
Figure 3:
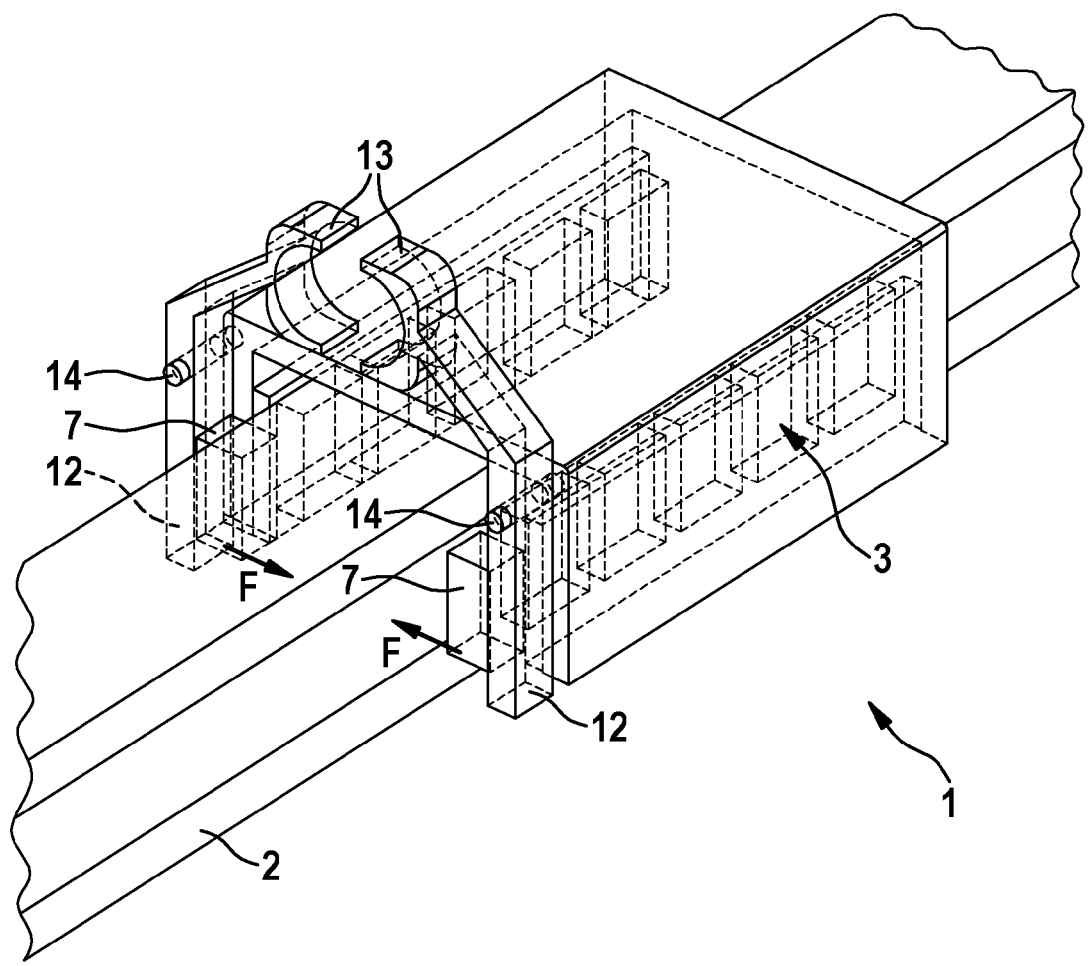
FIG. 3 shows a detail of the inventive linear drive according to the first exemplary embodiment.
Figure 4:
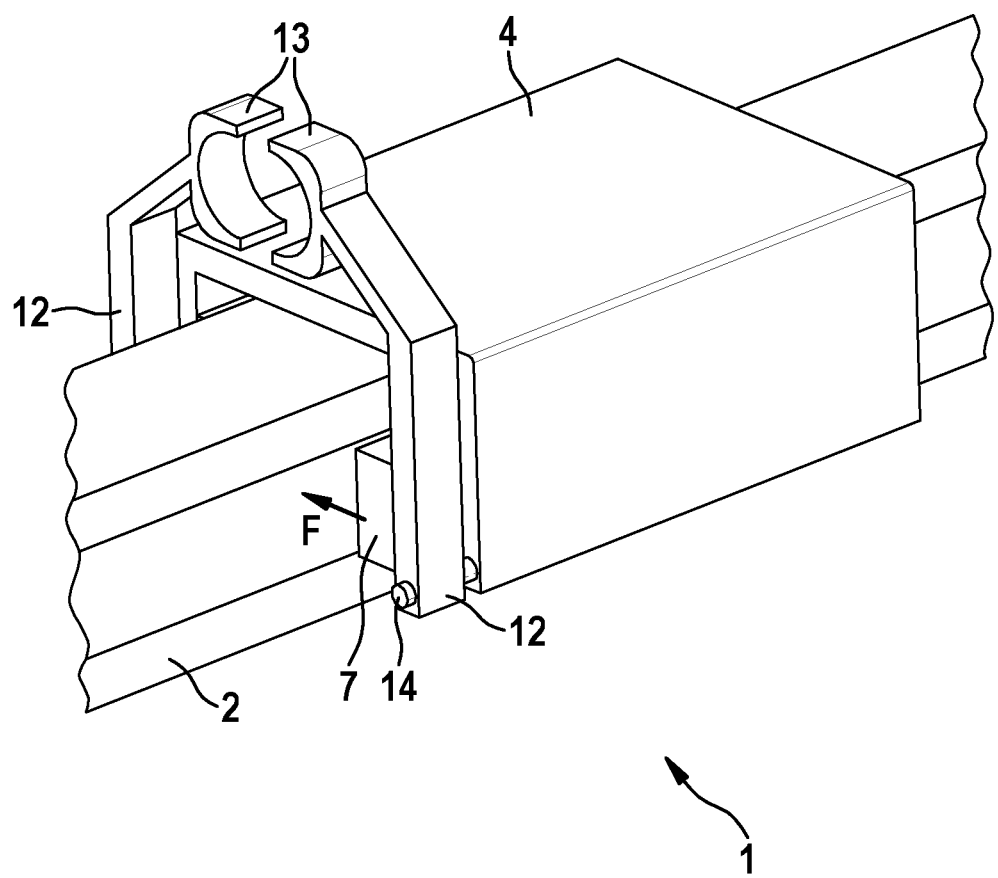
FIG. 4 shows a detail of the inventive linear drive according to a second exemplary embodiment.

A linear drive 1 for both exemplary embodiments is shown in FIG. 1 in a schematically simplified depiction. FIGS. 2 and 3 show the first exemplary embodiment. FIG. 4 shows a detail of the second exemplary embodiment. Identical or functionally identical components are provided with the same reference signs in all of the exemplary embodiments.

According to FIG. 1, the linear drive 1 comprises a running track 2. A plurality of primary magnets 3 is stationarily arranged on the running track 2. The primary magnets are designed as coils.

At least one movement unit 4 which is linearly movable in the movement direction 6 is disposed on the running track 2. A plurality of magnetic elements 5, designed as secondary permanent magnets, is disposed on the movement unit 4.

The primary magnets 3 can be activated individually or in groups. In so doing, a linear movement of the movement unit 4 is possible on the running track 2. By activating said primary magnets individually or in groups, a plurality of movement units 4 can be activated and moved independently of one another on the running track 2.

A magnetically activatable element 7 is arranged on the movement unit 4. The magnetically activatable element 7 is mechanically connected to an actuator 9. In the example depicted, the left permanent magnet 8 is currently not being used for driving the movement unit 4. The left primary magnet 8 can therefore be used to activate the magnetically activatable element 7. The delineated force F is transmitted to the magnetically activatable element 7 by means of the left primary magnet 8. The actuator 9 is moved according to the delineated actuator movement 10 by the force F. A return element 11, designed as a spring, restores the actuator to the initial position thereof.

FIG. 1 shows only the schematic principle of the invention. All possible actuators 9 on the movement unit 4 can be moved by activating the magnetically activatable element 7. In addition, it is possible to embody the magnetically activatable element 7 as a coil rather than as a ferromagnetic or permanently magnetic component. Voltage can be induced into said coil in a targeted manner. This voltage can in turn be used to switch an actuator as well as to supply current to a load on the movement unit 4.

FIG. 2 shows the linear drive 1 according to the first exemplary embodiment. According to FIG. 2, the running track 2 is designed in a continuous manner, i.e. as a closed ring. Two movement units 4, which can be moved independently of one another, are located on the running track 2.

FIG. 3 shows a detail from FIG. 2 in a partially transparent view.

Provision is made in this embodiment for two magnetically activatable elements 7, designed as ferromagnetic components. The magnetically activatable elements 7 can be moved inwards by a corresponding activation of the primary magnets 3. The actuator 9 comprises two levers 12 which each are connected via a pivot point 14 to the movement unit 4. The upper ends of the levers 12 are designed as a gripping contour 13. By moving the magnetically activatable elements 7 inwards, the gripping contour 13 opens in the first exemplary embodiment because the pivot points 14 are disposed between the circular contour 13 and the magnetically activatable elements 7.

FIG. 4 show a detail of the linear drive 1 according to the second exemplary embodiment. In the second exemplary embodiment, the magnetically activatable elements 7 and the gripping contour 13 are arranged on one side of the pivot points 14. As a result, the gripping contour closes when the magnetically activatable elements 7 are moved inwards.

The invention claimed is:

1. A linear drive (1), comprising:
   a running track (2)
   at least one movement unit (4) with at least one magnetic element (5), which is linearly movable on the running track (2),
   a plurality of electrical primary magnets (3) which are stationarily arranged on the running track (2) and act magnetically upon the at least one magnetic element (5), wherein the primary magnets (3) are configured to be activated individually or in groups for driving the movement unit (4),
   a magnetically activatable element (7) on the movement unit (4), wherein the magnetically activatable element (7) is configured to be activated by at least one primary magnet (3) independently of a drive of the movement unit (4), and
   an actuator (9) and/or a load on the movement unit (4), the magnetically activatable element (7) being in operative connection with the actuator (4).

2. The linear drive according to claim 1, characterized in that at least one primary magnet is configured to activate the magnetically activatable element (7), said primary magnet not being configured to drive the movement unit at the moment of activation of said magnetically activatable element.

3. The linear drive according to claim 1, characterized in that the magnetically activatable element (7) comprises a permanent magnet or a ferromagnetic component.

4. The linear drive according to claim 1, characterized in that the magnetically activatable element (7) acts mechanically upon the actuator (9).

5. The linear drive according to claim 1, characterized in that the magnetically activatable element (7) is disposed in a direction of movement (6) of the movement unit (4) in front of or behind the magnetic element (5).

6. The linear drive according to claim 1, characterized in that the magnetically activatable element (7) comprises an induction coil, wherein voltage can be induced into the induction coil by means of a primary magnet (3).

7. The linear drive according to claim 6, characterized in that the actuator (9) is configured to be supplied with current via the induction coil.

8. The linear drive according to claim 1, characterized in that the actuator (9) is configured to move and/or hold objects on the movement unit (4).

9. The linear drive according to claim 1, characterized in that the actuator (9) is configured to switch mechanical devices and/or current circuits.

10. The linear drive according to claim 1, characterized in that the actuator (9) is configured to switch a device that changes the running properties of the movement unit (4).

11. The linear drive according to claim 1, wherein the magnetic element (5) is a secondary magnet.

12. The linear drive according to claim 1, wherein the magnetically activatable element (7) is configured to be activated by at least one primary magnet (3) independently of a drive of the movement unit (4) for the transmission of energy to said magnetically activatable element.

13. A linear drive (1), comprising:
a running track (2)
at least one movement unit (4) with at least one magnetic element (5), which is linearly movable on the running track (2),
a plurality of electrical primary magnets (3) which are stationarily arranged on the running track (2) and act magnetically upon the at least one magnetic element (5), wherein the primary magnets (3) can be activated individually or in groups for driving the movement unit (4),
a magnetically activatable element (7) on the movement unit (4), wherein the magnetically activatable element (7) can be activated by at least one primary magnet (3) independently of the drive of the movement unit (4), and
at least one of an actuator (9) and a load on the movement unit (4), the magnetically activatable element (7) being in operative connection with the at least one of the actuator (9) and the load.

14. The linear drive according to claim 13, characterized in that at least one primary magnet is configured to activate the magnetically activatable element (7), said primary magnet not being configured to drive the movement unit at the moment of activation of said magnetically activatable element.

15. The linear drive according to claim 13, characterized in that the magnetically activatable element (7) comprises a permanent magnet or a ferromagnetic component.

16. The linear drive according to claim 13, characterized in that the magnetically activatable element (7) acts mechanically upon the actuator (9).

17. The linear drive according to claim 13, characterized in that the magnetically activatable element (7) is disposed in a direction of movement (6) of the movement unit (4) in front of or behind the magnetic element (5).

18. The linear drive according to claim 13, characterized in that the magnetically activatable element (7) comprises an induction coil, wherein voltage can be induced into the induction coil by means of a primary magnet (3).

19. The linear drive according to claim 18, characterized in that the at least one of the load and the actuator (9) is configured to be supplied with current via the induction coil.

* * * * *